Sept. 21, 1954     F. H. SCHMIDT     2,689,553
AUTOMATIC TAPPET
Filed June 17, 1950
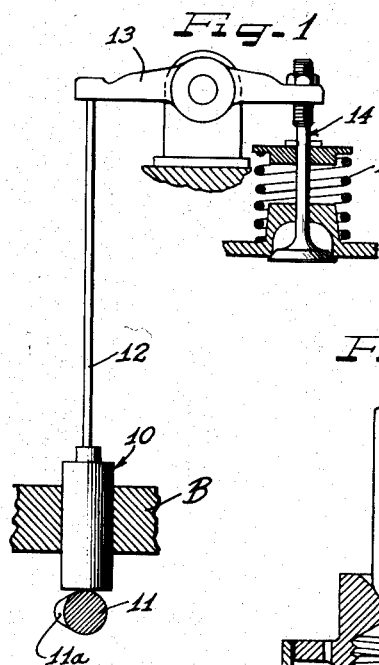
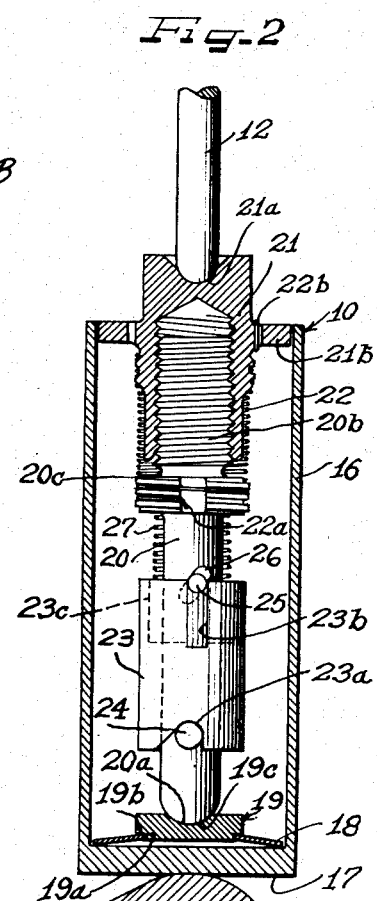
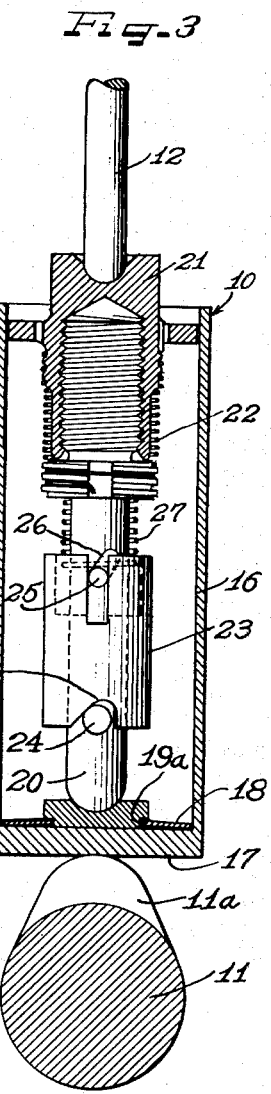
Inventor
FREDERICK H. SCHMIDT Patented Sept. 21, 1954

2,689,553

UNITED STATES PATENT OFFICE 2,689,553

AUTOMATIC TAPPET

Frederick H. Schmidt, Willoughby, Ohio, assignor to Thompson Products, Inc., Cleveland, Ohio, a corporation of Ohio Application June 17, 1950, Serial No. 168,729

8 Claims. (Cl. 123—90)

This invention relates to an automatic tappet or lash adjuster with a built-in constant clearance element. Specifically the invention relates to an automatic valve clearance regulator composed of threaded-together screw and nut parts that are spring biased to an extended position by rotation of the nut part on the screw or stud part, and wherein a deflectable spring washer is interposed between the screw part and the actuator for the regulator to maintain a constant clearance.

The invention will be hereinafter specifically described as embodied in a mechanical automatic valve tappet, but it should be understood that the principles of the invention are generally applicable to lash adjusters including hydraulic clearance regulators, push rods, and the like.

Automatic valve tappets are designed to produce zero clearance or zero lash in the valve linkage. These tappets will elongate as soon as they are unloaded. Such unloading may occur after the valve is closed by irregularities in the base circle of the tappet operating cam, or by deflection of the cam shaft or component valve gear parts. In addition, irregularities on the bottom surface of the tappet body can also permit undesired elongation of the regulator. Such elongation will remove any slack in the linkage and will produce such a tight assembly that the valve may be partially opened before the tappet is actuated by the lobe on the cam.

In accordance with this invention, a spring washer is built into the tappet and is adapted to absorb tappet movements caused by cam shaft deflection, cam run outs, tappet body irregularities, and the like, to maintain a predetermined clearance in the linkage without, however, permitting looseness to develop in the linkage. The spring washer will effectively resist the bias of the regulator, but will collapse under the load of the valve spring so that the aforementioned irregularities will not open the valve. In its collapsed position, the washer will transmit movement of the cam lobe to open the valve.

It is, then, an object of this invention to provide a lash adjuster with a built in constant clearance element.

A further object of the invention is to provide a valve clearance regulator with a built in spring washer for maintaining a constant clearance in the valve linkage without developing looseness in the linkage.

A still further object of the invention is to provide a Belleville type spring washer in an automatic valve tappet assembly for absorbing movements caused by irregularities in the valve linkage without permitting looseness to develop in the linkage.

Another object of the invention is to provide a valve clearance regulator having torsion spring biased threaded-together parts including a clearance compensating nut and mated stud with a spring washer between the stud and the actuator for the regulator.

Other and further objects of the invention will be apparent to those skilled in the art from the following detailed description of the annexed sheet of drawings which, by way of a preferred example, illustrates one embodiment of the invention.

On the drawings:

Figure 1 is a somewhat schematic elevational view with parts in vertical cross section illustrating a well known form of overhead valve linkage which is equipped with an automatic tappet embodying the principles of this invention;

Figure 2 is a longitudinal cross-sectional view taken through the automatic tappet of this invention and illustrating the position of the parts in their unloaded condition when the valve is closed;

Figure 3 is a view similar to Figure 2 but illustrating the positions of the parts in their loaded or valve opening position.

As shown on the drawings:

In Figure 1, the automatic tappet 10 of this invention is slidably mounted in an engine block "B" and is actuated by a cam shaft 11 having a cam lobe 11a. The tappet 10 in turn actuates a push rod 12 which acts on a rocker arm 13 to open a poppet valve 14 which is spring urged to closed position by a spring 15.

As shown in Figures 2 and 3, the tappet 10 includes a cylindrical housing cup 16 with a flat bottom wall 17 acted on by the cam shaft 11. A Belleville spring washer 18 is mounted in the bottom of the cup with its apex facing the open top of the cup. A metal disk 19 has a reduced diameter pilot portion 19a extending through the aperture of the washer 18 to project slightly beyond the apex of the washer. A shoulder 19b on the disk rests on top of the apex of the washer and a fragmental spherical recess 19c is provided in the center of the top face of the disk. A stud 20 has a rounded end 20a seated in the recess 19c. The opposite end of the stud is threaded as at 20b and receives a nut 21 in threaded relation therearound. The nut has a recess 21a in its upper end receiving the rounded bottom end of the push rod 12. A flange 21b extends from the nut intermediate the ends thereof into close fitting sliding relation with the side wall of the cup 16 for holding the stud in the central portion of the cup.

A torsion spring 22 is wound around the nut and around a head portion 20c of the stud. One end 22a of the spring 22 is anchored to the head 20c while the other end 22b of the spring is anchored in an aperture in the flange 21b of the nut 21.

The torsion spring 22 is wound to rotate the nut 21 on the stud 20 for unscrewing and elongating the assembly.

An inertia hammer sleeve 23 is slidably mounted on the stud 20 between the end 20a and the head 20c thereof. This sleeve has a recess 23a in the bottom face thereof receiving a pin 24 projecting from the stud 20. The opposite end of the sleeve 23 has an axially extending slot 23b receiving a pin 25 freely disposed in an elongated inclined aperture 26 in the stud. The relationship between the pin 25 and slot 26 is such as to permit a generally helical movement of the pin relative to the stud 20.

The upper end of the sleeve 23 has a recess 23c therein. A coil spring 27 having one end bottomed against the stud head 20c and the other end bottomed on the pin 25 is disposed around the stud above the sleeve 23 and is adapted to be received into the sleeve recess 23c.

The inertia sleeve 23 is free to shift axially on the stud 20 under the influence of inertia forces produced by the acceleration and deceleration of the tappet 10, such as occur in the normal cycle of operation of the valve linkage. In each such cycle of operation, the sleeve 23 will be displaced upwardly on the stud 20 as shown in Figure 3, and will then be displaced downwardly as shown in Figure 2. Throughout the major portion of both of these axial movements of the sleeve, it will be confined along an axial path by the guide pin 25 so that any angular acceleration of the tappet will have no substantial effect on the movement of the sleeve.

When the sleeve is displaced upwardly it will only have axial movement on the stud until the end wall of the slot 23b engages the guide pin, whereupon the resulting impact force will displace the guide pin helically in its supporting aperture 26 to be resiliently cushioned by the spring 27 engaging the top of pin 25.

When the sleeve shifts downwardly, it again follows a substantially axial path through the major portion of its movement until the helical side of the recess 23a strikes the abutment pin 24 thereby causing a torsional rotating force on the stud tending to thread the stud into the nut.

It will therefore be understood that the tappet 10 has a torsion spring 22 which tends to elongate the assembly and has an inertia hammer 23 resisting the action of the torsion spring to foreshorten the assembly. The torsion spring 22 will maintain zero clearance in the valve linkage and the inertia hammer will prevent development of negative clearance.

Any irregularities due to run outs of the cam surface before the lobe 11a engages the bottom 17 of the assembly will be absorbed by the spring washer 18 without causing any movement of the stud supported by the spring washer. However, when the cam lobe 11a raises the tappet 10, the washer 18 will collapse to seat the pilot portion 19a of the disk 19 on the bottom wall of the cup 16 and cam movement will be imparted to the stud 20 and thence through the nut 21 to the push rod 12 for opening the valve 14. The projecting pilot portion 19a prevents the washer 18 from assuming a reverse position with its periphery at a higher level than its central portion. The spring 18 will therefore always have a spring component attempting to reclaim the height shown in Figure 2. The space between the pilot portion 19a and the bottom of the cup 16 represents the constant clearance provided by the assembly.

The washer 18 will not be collapsed by the load of the torsion spring 20 but is not strong enough to resist the load of the spring 15 so that it will resiliently deflect under the influence of movements caused by irregularities in the cam shaft without having any opening effect on the valve. As soon as the cam lobe 11a actuates the tappet, the spring will fully collapse to transmit the cam motion for fully opening the valve. As looseness develops through wear or heat expansion of the parts, the torsion spring is effective to reclaim any gap so that the spring 18 will always be under load.

From the above descriptions, it should be understood that the built-in constant clearance element provided by this invention in a valve clearance regulator provides a simple inexpensive expedient arrangement for preventing undesirable tightness in valve linkages without imparting looseness or play in such linkages.

It will be understood that modifications and variations may be effected without departing from the scope of the novel concepts of the present invention.

I claim as my invention:

1. In combination in a valve linkage including an automatic valve clearance regulator, a hollow regulator housing having a flat solid bottom and a cylindrical side wall, an actuator abutting said housing bottom for actuating the linkage, a frusto-conical spring washer seated within said hollow housing and on the bottom thereof with its outer base periphery normally of less diameter than the cylindrical bottom of the housing and with its inner apical periphery normally spaced above said flat housing bottom, a load transmitting disk member carried in the aperture of said washer having a shoulder abutting the upper surface of the apex of said washer and a cylindrical reduced diameter portion extending through the aperture of said washer to project slightly beyond the apex of the washer toward the housing bottom, the reduced diameter portion being spaced from said housing bottom a distance less than the spacing of said apex from said housing bottom to prevent the washer from assuming a reverse position by abutment of the end of the reduced diameter portion against said housing bottom during actuation of the linkage.

2. In a valve linkage including an automatic valve clearance regulator, the improvement of a conical apertured spring washer and a load transmitting disk member carried in the aperture of said washer having a shoulder abutting the upper surface of the apex of said washer and having a reduced portion extending through the aperture of the washer and of length slightly greater than the thickness of said washer to prevent reversal of the spring washer upon deflection thereof when the washer is disposed on a flat surface by abutment of said reduced portion against said flat surface.

3. An automatic lash adjuster comprising a cup-shaped housing having a closed end and an opposite open end, a nut part slidably mounted within said housing adjacent the open end thereof and having a longitudinal internally threaded bore opening into the interior of said housing, a screw part having an externally threaded end threaded into said bore of said nut part, a torsion spring anchored on said nut part and said screw part biasing the parts toward an unscrewed elongated position, an inertia hammer on the screw part within said housing effective to rotate the screw part into the nut part for reducing the effective over-all length of the parts, an actuator abutting said closed end of said housing, and means interposed between the interior surface of said closed end and the adjacent end of said screw part for transmitting actuator forces through the housing closed end to said screw part.

4. An automatic lash adjuster comprising a cup-shaped housing having a closed end and an open end, an actuator abutting the closed end of said housing, a screw member extending longitudinally within said housing and having one end adjacent said closed end of said housing for actuation by said actuator through said housing closed end, a nut part threaded onto said screw member and having a peripheral flange extending laterally therefrom and in sliding relation to the interior wall of said housing for guiding reciprocating movement of said nut part in said housing, means biasing said parts toward an extended position, and an inertia hammer on the screw member within said housing effective to rotate the screw member into the nut part for reducing the effective over-all length of the screw member and nut part.

5. An automatic lash adjuster comprising a cup-shaped housing having an open end and a closed end, an actuator abutting the closed end of said housing, a disk member disposed adjacent said closed end interiorly of said housing and having an end face with a fragmental spherical recess therein, a screw part extending longitudinally in said housing and having a rounded end seated in said fragmental spherical recess of said disk member, means for positioning said disk member at the closed end of said housing for transmitting actuating forces from said actuator and said closed end of said housing to said screw part, a nut part longitudinally reciprocally mounted at the open end of said housing and threaded on to said screw part, a torsion spring anchored on said nut part and said screw part biasing the parts toward an unscrewed elongated position, and an inertia hammer on the screw part within said housing effective to rotate the screw part into the nut part for reducing the effective over-all length of the parts, said actuator forces being transmitted from said disk member through said screw part to said nut part longitudinally of said parts by means of said fragmental spherical recess in said disk member to prevent binding of the threaded together parts.

6. An automatic lash adjuster comprising a cup-shaped housing having an open end and a closed end, an actuator abutting the closed end of said housing, a disk member disposed adjacent said closed end interiorly of said housing and having an end face with a fragmental spherical recess therein, a screw part extending longitudinally in said housing and having a rounded end seated in said fragmental spherical recess of said disk member, means for positioning said disk member at the closed end of said housing for transmitting actuating forces from said actuator and said closed end of said housing to said screw part, a nut part longitudinally reciprocally mounted at the open end of said housing and threaded onto said screw part, a torsion spring anchored on said nut part and said screw part biasing the parts toward an unscrewed elongated position, an inertia hammer on the screw part within said housing effective to rotate the screw part into the nut part for reducing the effective over-all length of the parts, said actuator forces being transmitted from said disk member through said screw part to said nut part longitudinally of said parts by means of said fragmental spherical recess in said disk member to prevent binding of the threaded together parts, and a conical spring washer bottomed at said closed end of said housing and having a central aperture receiving said disk member for normally positioning said disk member in spaced relation to said closed end, said spring washer collapsing to bottom said disk member on said closed end during transmission of actuating forces to said screw part.

7. An automatic lash adjuster assembly comprising an elongated housing having an end wall and a longitudinally extending side wall connected with said end wall, a nut part mounted in said housing in sliding relation to said side wall, a screw part extending longitudinally within said housing and having one end threaded into said screw part, means biasing said threaded together parts toward an extended position, an inertia hammer counteracting said biasing means to move the threaded together parts toward a contracted position, an actuator acting on the exterior of said housing end wall for reciprocating the housing, a conical spring washer bottomed in said housing on said end wall, and a member carried by said washer and receiving the adjacent end of said screw part, said spring washer deflecting to bottom said member on the housing end wall for transmission of load to the screw part.

8. In combination in a valve linkage, a hollow regulator housing having a bottom and a side wall, an actuator abutting said housing bottom for actuating the linkage, a spring washer seated within said hollow housing and on the bottom thereof with its inner apical periphery normally spaced above said housing bottom, and a load transmitting member carried in the aperture of said washer having a shoulder abutting the upper surface of the apex of said washer and having a reduced portion extending through the aperture of said washer and spaced above the housing bottom a distance of less than the normal spacing between the inner apical periphery of the washer and the outer periphery of the washer to prevent the washer from assuming a reverse position, said reduced portion abutting against said bottom during actuation of said linkage by said actuator.

References Cited in the file of this patent

UNITED STATES PATENTS

| Number | Name | Date |
| --- | --- | --- |
| 1,445,118 | Ware | Feb. 13, 1923 |
| 1,607,128 | Johansen | Nov. 16, 1926 |
| 2,066,976 | Holmes | Jan. 5, 1937 |
| 2,250,752 | Dayton | July 29, 1941 |
| 2,404,478 | Engemann | July 23, 1946 |
| 2,468,332 | Johnson | Apr. 26, 1949 |
| 2,539,877 | Voorhies | Jan. 30, 1951 |